May 26, 1936.  G. F. CONNELLY  2,041,818

MACHINE FOR REMOVING TIRE TREADS

Filed Feb. 18, 1935  2 Sheets-Sheet 1

INVENTOR.
GEORGE F. CONNELLY
BY
ATTORNEY

May 26, 1936. G. F. CONNELLY 2,041,818
MACHINE FOR REMOVING TIRE TREADS
Filed Feb. 18, 1935 2 Sheets—Sheet 2
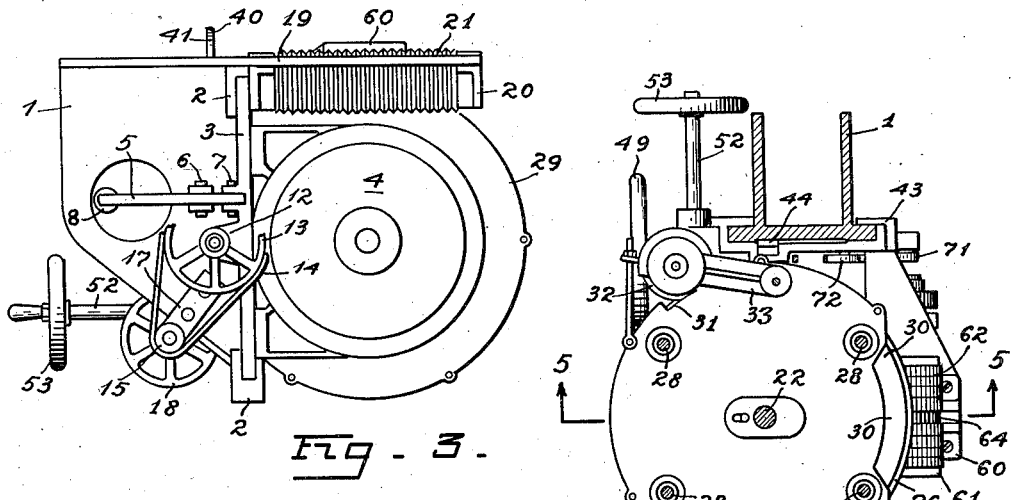
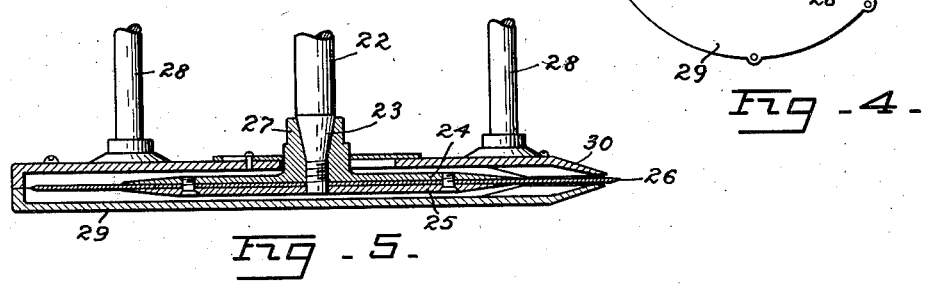
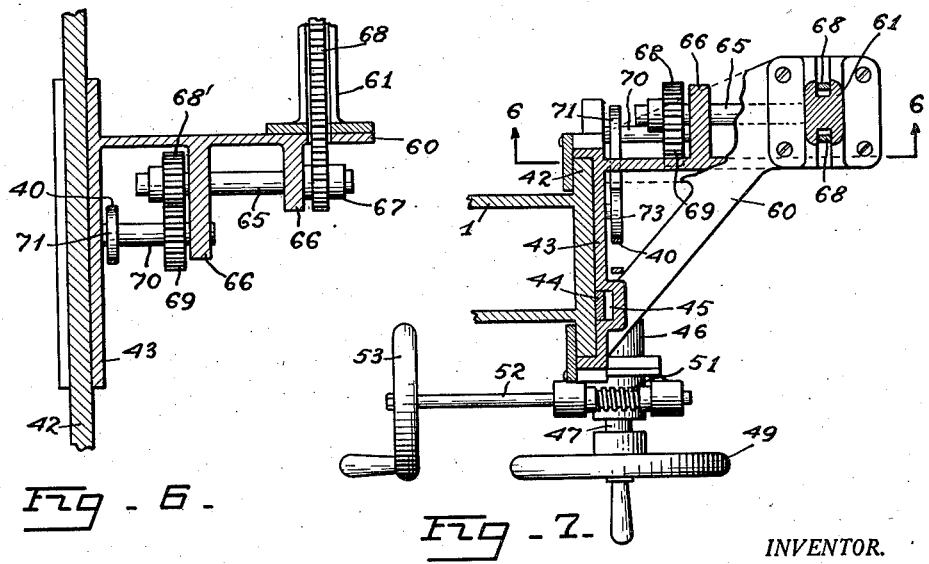
INVENTOR.
GEORGE F CONNELLY
BY
ATTORNEY Patented May 26, 1936

2,041,818

UNITED STATES PATENT OFFICE 2,041,818

MACHINE FOR REMOVING TIRE TREADS

George F. Connelly, San Francisco, Calif.

Application February 18, 1935, Serial No. 6,972

10 Claims. (Cl. 164—60)

This invention relates particularly to a machine for splitting or cutting the worn tread surface from a full circle pneumatic tire preliminarily to retreading said tire.

An object of the invention is to provide a machine for cutting the worn tread surface from a full circle tire carcass wherein by continuous operation, any selected thickness of the worn material may be cut from the exterior of said tire, means being provided to maintain the tread portion of the said tire in a flattened condition during the cutting operation.

A still further object of the invention is to provide a machine for cutting the worn tread from a full circle tire, wherein the cutting knife is adjustable relative to the surface of the worn tread of the tire to be removed therefrom, in order to regulate the depth of cut to be made on said tire, and wherein serrated rollers are provided adjacent the cutting knife, between which rollers the tire carcass is flattened, and by means of said rollers held in a constant position throughout the entire tread removing operation.

Other objects and advantages are to provide a machine for removing worn tire treads that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawings:

Fig. 3 is a plan view of Fig. 1.

Fig. 4 is a plan section taken through Fig. 2 on the line 4—4.

Fig. 5 is an enlarged cross section through the cutting knife and sheaf, taken on the line 5—5 of Fig. 4.

Fig. 6 is a section taken through Fig. 7 on the line 6—6.

Fig. 7 is an enlarged plan section taken through Fig. 1 on the line 7—7.

Figures 1, 2:
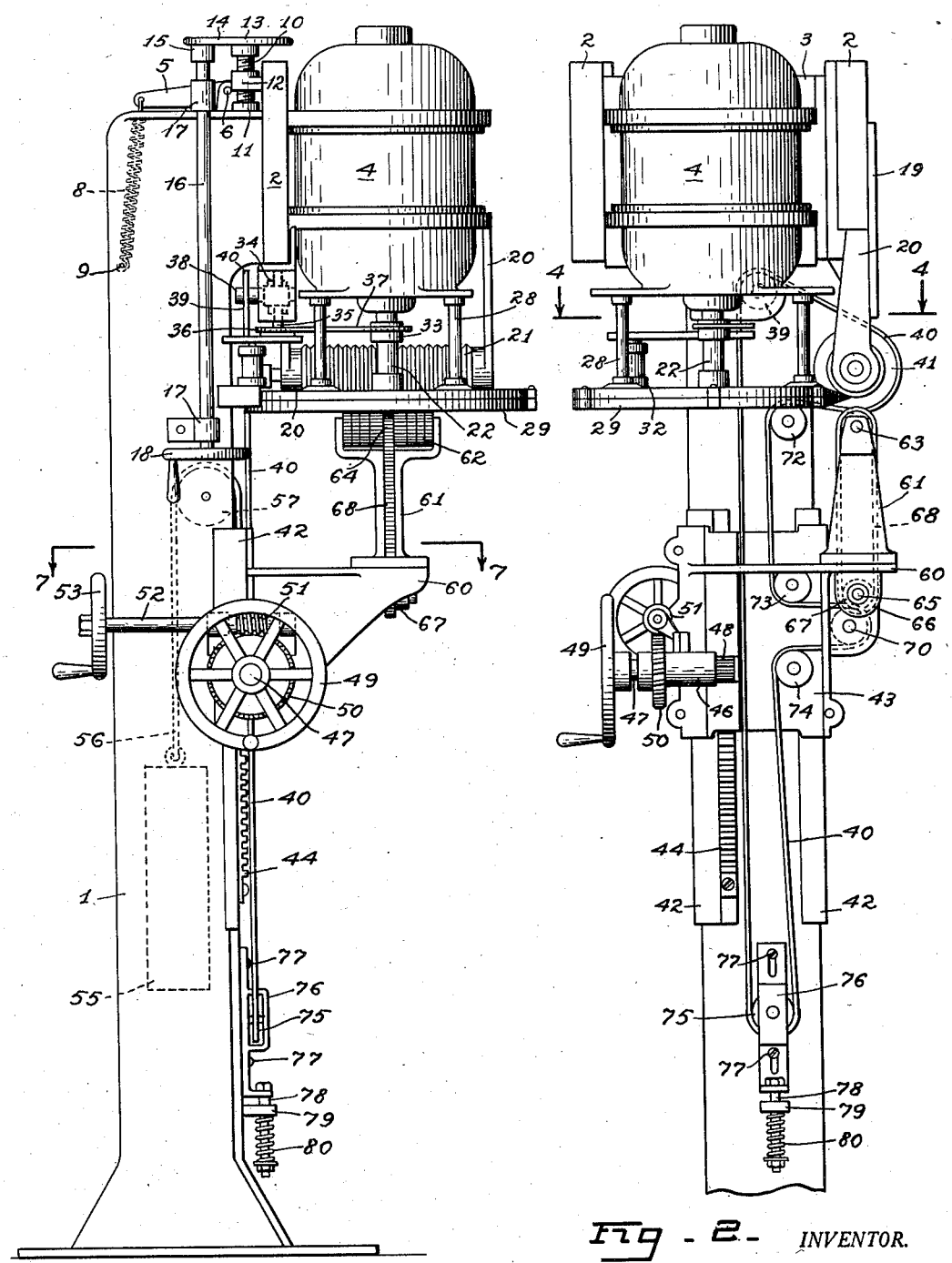
Fig. 1 represents a front elevation of a tire tread splitting machine constructed in accordance with my invention.
Fig. 2 is a side elevation of Fig. 1.

The machine to be hereinafter described is designed to cut or split the worn tread from a full circle pneumatic tire carcass evenly and uniformly therearound, and by automatic continuous operation, whereby the cost of removing said worn tread surface as well as the period of time necessary to effect the removal of the same, is materially reduced below the cost and time involved where the tread removal is effected by hand.

In detail the construction illustrated in the drawings comprises a vertical or upright frame 10 of the tread splitting machine which is generally designated by the numeral 1, and which includes the foundation structure on which all of the operating parts of the machine are mounted. The frame 1 is preferably hollow or box-like in cross section, and at its upper end and on one side thereof, is provided with a vertically disposed head piece 2. The opposite vertical edges of the head piece 2 are in the nature of guides, and between which a slide member 3 is slidably confined. A motor 4 is mounted on the slide 3, with the central axis of said motor in the vertical plane. A beam 5 is pivoted at 6 intermediate its ends on the upper end of the frame 1, and one end of said beam is pivoted at 7 to the upper end of the slide 3. The other end of the beam 5 has a tension spring 8 secured thereto, which spring is secured at its opposite end to a fixed point 9 on the frame 1. The tension of the spring 8 is such that it will counterbalance the weight of the motor and slide, and maintain the said motor in a relatively fixed position at all times. However, the motor and slide may be adjusted vertically by means of a threaded shaft 10 journaled in a bearing 11 on the upper end of said frame 1, said slide 3 having a running nut 12 thereon engaging the threaded shaft 10. A sprocket 13 is fixed to the shaft 10, and said sprocket is turned by a belt or chain 14 which passes around a sprocket 15 on a shaft 16, journaled in bearings 17—17 on the frame 1. A handle 18 is provided on the lower end of the shaft 16, whereby said shaft may be manually rotated, and said rotative movement transmitted to the threaded shaft 10 and thence to the slide 3. In view of the fact that the spring 8 counterbalances the motor and slide, very little effort is required to move said motor either vertically upward or downward.

A plate 19 is provided on one side of the frame 1, which plate has a pair of bearing members 20—20 extending downwardly therefrom on opposite sides thereof, and between which bearing members a serrated or knurled roller 21 is rotatably mounted. The roller 21 is provided with annular corrugations or ribs throughout the entire length thereof, to provide a surface for engaging the exterior of the tire carcass, and preventing any sidewise slipping movement of the said tire relative to the longitudinal axis of said roller.

The drive shaft 22 of the motor 4 extends from the lower end thereof and terminates in a tapered end 23. A pair of flanged plates 24 and 25, which are circular in contour, have the circular cutting knife 26, clamped therebetween, and the flange plate 24 is provided with a hub portion 27 which is adapted to be screwed onto the tapered end of the motor shaft 22, or held thereon in some other conventional manner. The cutting blade 26 is thus fixedly attached to the motor shaft 22 and rotates at motor speed at all times. A plurality of studs 28 are attached to the lower side of the motor housing and the lower ends of said studs carry a casing or guard 29, which encloses the cutting blade 22 substantially throughout the entire circumference thereof, except on the side thereof adjacent the roller 21. At this point, the upper and lower walls of said casing are tapered as at 30 to a point rearwardly of the projecting cutting edge of the blade 26. The casing 29 is also provided with a cut-away portion 31, to permit a grinder or sharpening wheel 32 to be engaged with the blade 26 for the purpose of maintaining the same in a sharpened condition at all times, said sharpening wheel 32 being rotatably mounted on an arm 33 supported on the upper side of the knife guard 29.

The motor shaft 22 is provided with a sprocket 33 thereon. A reduction gear box 34 is mounted on the lower end of the slide 3, said gear box having a pair of meshing spiral or bevel gears journaled therein. One of said gears has a vertically disposed shaft 35 thereon, which extends out from the box 34 and has a sprocket 36 thereon. A chain or belt 37 passes around the motor shaft sprocket 33 and gear box sprocket 36 for transmitting the driving power of the motor to the said gear box. The other gear in the gear box 34 has a horizontally disposed shaft 38 extended therefrom, and on which a sprocket 39 is mounted. A drive chain or belt 40 to be hereinafter described, passes around said sprocket 39, likewise around a sprocket 41 on the roller 21 for driving said roller.

The face of the frame 1 below the motor mounting is provided with a pair of parallel guides 42—42 on opposite sides thereof, and upon which a carriage 43 is slidably mounted. A gear rack 44 is mounted on the face of the frame 1, and said rack is confined in a groove 45 in the face of the carriage 43. A bearing 46 is provided on the face of the carriage 43 and within which a shaft 47 is journaled, one end of said shaft having a gear 48 thereon which meshes with the rack 44, for raising and lowering the carriage 43 on the frame. The shaft 47 is provided with a worm wheel 50 therearound, which worm wheel meshes with a worm 51 journaled on the carriage 43 at right angles to the shaft 47, said worm 51 having a shaft 52 attached thereto, and a wheel 53 on said shaft 52. The worm 51, when turned, permits micrometric adjustments of the carriage 43, while the hand wheel 49 is used for raising and lowering the carriage 43 into and from the operating position. The weight of the carriage 43 is counterbalanced by a counterweight 55 confined within the frame 1, said counterweight 55 being connected by a cable 56 to the upper end of the carriage 43, which cable passes around a pulley 57 journaled within the frame 1.

The platform 60 is projected outwardly from one face of the carriage 43, and said platform has a bracket 61 mounted on the upper side thereof. A serrated roller or wheel 62 is rotatably mounted on a shaft 63 journaled in the opposite upper ends of the bracket 61. The roller 62 has its axis journaled in the horizontal plane in vertical alignment with the axis of the roller 21, and parallel thereto. A sprocket 64 is provided around the central portion of the roller 62. A horizontally disposed shaft 65 is journaled in bearings 66—66 on the underside of the platform 60. One end of the shaft 65 is provided with a sprocket 67 thereon, and a drive chain or belt 68 passes around said sprocket 67 and the sprocket 64 on the roller 62. The other end of the shaft 65 is provided with a pinion 68 thereon which meshes with a pinion 69 on a shaft 70 rotatably journaled in the face of the carriage 43 and bearing support 66. A sprocket or pulley 71 is also provided on the shaft 70. An idler sprocket or pulley 72 is journaled on the frame 1 substantially opposite the upper roller 21, and in vertical alignment therewith on the carriage 43, the idler pulleys or sprockets 73 and 74 are rotatably mounted. A pulley or sprocket 75 is also arranged adjacent the lower end of the frame 1, the same being rotatably mounted in a cage 76 slidably guided on pins 77. A bolt 78 extends between the lower end of the cage 76 and the fixed abutment 79 on the frame 1, and a spring 80 is provided around the bolt 78 to work against the fixed abutment 79 to exert a downward pull on the cage 76.

The chain or belt 40 which has been heretofore described as connecting the sprockets 39 and 41, extends around the idler pulley 72, the idler pulley 73, the drive sprocket 71, the idler pulleys 74 and 75, and back to the main drive sprocket 39. The gears 68 and 69 on the carriage 43 serve to reverse the direction of drive of the roller 62 so that the rollers 21 and 62 will rotate in opposite directions.

The device operates as follows: A tire carcass from which the worn tread surface is to be removed, is hung or supported pendant fashion, on the lower roller 62, after the carriage 43 and roller 62 have been lowered away from the tread roller 21. The length of the roller 62 is such that it will deform the normal circular cross section of a pneumatic tire casing and provide a substantially flattened portion across the tread portion thereof. The carriage and roller is then elevated into a position of contact with the upper roller 21 and the tread portion of the tire is squeezed between the rollers 21 and 62 until that portion of the tire between the rollers is compacted to a degree that it cannot yield. The cutting edge of the blade 26 would then be adjusted through the adjustment means provided on the motor support, into a selected cutting position on the tread surface of the tire carcass. The amount of cut to be made on the tread portion of the tire, or the thickness of rubber to be cut therefrom, may be regulated by the placement of the knife relative to the tread portion of the tire. Both of the rollers 21 and 62 drive the tire carcass between them toward the rotating cutting blade, and the operation of cutting said tread portion from the tire is continuous and automatic. The same thickness of worn tread will be removed from the said tire around the complete circumference thereof, without the necessity of the operator being on hand to regulate the machine during the cutting operation. After the desired amount of tread surface has been removed from the tire, the carriage 43 and bottom roller 62 would be lowered, the tire removed from the said roller, and the cutting operation repeated. It will be noted that the carriage 43 is in constant driving connection with the drive chain or belt 40 at all times, whether in the raised position shown in Fig. 2, or when in the lowered position.

Having thus described this invention, what I claim and desire to secure by Letters Patent is:

1. An apparatus to cut the tread from a full circle tire casing, comprising a driven roller insertable within the said casing; a driven roller engageable with the outer tread surface of said casing; means to move said first mentioned roller with the casing thereon into contact with the last mentioned roller whereby said casing will be flattened between the rollers and be advanced circumferentially therebetween; and a driven circular cutting knife engageable with the outer tread surface of the casing as said casing is fed from the rollers.

2. An apparatus to cut the tread from a full circle tire casing, comprising a frame; a carriage adjustably mounted on said frame; a roller on said carriage insertable within the tire casing to support said casing in a hanging position thereon; a roller on said frame; means to move said carriage to elevate the tread surface of the casing into contact with said last mentioned roller and to flatten said casing therebetween; means to drive said rollers in opposite directions to move the casing circumferentially therebetween; and a driven circular cutting knife engageable with the outer tread surface of the casing as said casing is fed between the rollers.

3. An apparatus to cut the tread from a full circle tire casing, comprising a driven roller insertable within the said casing; a driven roller engageable with the outer tread surface of said casing; means to move said first mentioned roller with the casing thereon into contact with the last mentioned roller whereby said casing will be flattened between the rollers and be advanced circumferentially therebetween; and a driven circular cutting knife engageable with the outer tread surface of the casing as said casing is fed from the rollers, said cutting knife being rotatable on a horizontal plane about a vertical axis.

4. An apparatus to cut the tread from a full circle tire casing, comprising a driven roller insertable within the said casing; a driven roller engageable with the outer tread surface of said casing; means to move said first mentioned roller with the casing thereon into contact with the last mentioned roller whereby said casing will be flattened between the rollers and will be advanced circumferentially therebetween; a driven circular cutting knife engageable with the outer tread surface of the casing as said casing is fed from the rollers; and means for raising and lowering said cutting knife relative to the tread surface of the casing for regulating the depth of cut to be made by said knife on said tread surface.

5. An apparatus to cut the tread from a full circle tire casing, comprising a frame; a carriage adjustably mounted on said frame; a roller on said carriage insertable within the tire casing to support said casing in a hanging position thereon; a roller on said frame; means to move said carriage to elevate the tread surface of the casing into contact with said last mentioned roller and to flatten said casing therebetween; a motor adjustably mounted on said frame; a horizontally disposed circular cutting knife driven by the motor shaft; means connecting said motor shaft to the rollers to drive said rollers in opposite directions to move the tire casing circumferentially toward the cutting knife; and means for adjusting the edge of the cutting knife relative to the tread surface of the tire casing.

6. An apparatus to cut the tread from a full circle tire casing, comprising a frame; a carriage slidably mounted on said frame; a weight on said frame to counterbalance the weight of said carriage; a roller on said carriage insertable within the tire casing to support said casing in a hanging position thereon; a roller on said frame; means to move said carriage to elevate the tread surface of the casing into contact with said last mentioned roller and to flatten said casing therebetween; means to drive said rollers in opposite directions to move the casing circumferentially therebetween; and a driven circular cutting knife engageable with the outer tread surface of the casing as said casing is fed between the rollers.

7. An apparatus to cut the tread from a full circle tire casing, comprising a frame; a carriage slidably mounted on said frame; a weight on said frame to counterbalance the weight of said carriage; a roller on said carriage insertable within the tire casing to support said casing in a hanging position thereon; a roller on said frame; means to move said carriage to elevate the tread surface of the casing into contact with said last mentioned roller and to flatten said casing therebetween; and means for raising and lowering said cutting knife relative to the tread surface of the casing for regulating the depth of cut to be made by said knife on said tread surface.

8. An apparatus to cut the tread from a full circle tire casing, comprising a frame; a carriage adjustably mounted on said frame; a roller on said carriage insertable within the tire casing to support said casing in a hanging position thereon; a roller on said frame; means to move said carriage to elevate the tread surface of the casing into contact with said last mentioned roller and to flatten said casing therebetween; a vertically disposed slide on said frame; a motor on said slide; a horizontally disposed circular cutting knife driven by the motor shaft; means to counterbalance the weight of said slide, motor and knife on said frame; means connecting said motor shaft to the rollers to drive said rollers in opposite directions to move the tire casing circumferentially toward the cutting knife; and means for adjusting the edge of the cutting knife relative to the tread surface of the tire casing.

9. An apparatus to cut the tread from a full circle tire casing, comprising a driven roller insertable within the said casing; a driven roller engageable with the outer tread surface of said casing; means to move said first mentioned roller with the casing thereon into contact with the last mentioned roller whereby said casing will be flattened between the rollers and be advanced circumferentially therebetween; a driven circular cutting knife engageable with the outer tread surface of the casing as said casing is fed from the rollers; and a casing having tapered side walls on opposite sides of the the cutting knife and arranged rearwardly of the edge of said knife adjacent the rollers to divert the tread that is cut from the tire casing.

10. An apparatus to cut the tread from a full circle tire casing, comprising a frame; a carriage adjustably mounted on said frame; a roller on said carriage insertable within the tire casing to support said casing in a hanging position thereon; a roller on said frame; means to move said carriage to elevate the tread surface of the casing into contact with said last mentioned roller and to flatten said casing therebetween; and means to drive said rollers synchronously in opposite directions to move the tire casing circumferentially therebetween, said means driving the carriage roller in all positions of adjustment of said carriage; and a driven circular cutting knife engageable with the outer tread surface of the casing as said casing is fed between the rollers.

GEORGE F. CONNELLY.